United States Patent
Chen et al.

(10) Patent No.: US 10,795,200 B2
(45) Date of Patent: Oct. 6, 2020

(54) DISPLAY DEVICE

(71) Applicant: InnoLux Corporation, Miao-Li County (TW)

(72) Inventors: Chien-Chih Chen, Miao-Li County (TW); Chia-Chun Yang, Miao-Li County (TW); Chin-Cheng Kuo, Miao-Li County (TW); Hsin-Tien Wu, Miao-Li County (TW); Chih-Jen Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/253,867

(22) Filed: Jan. 22, 2019

(65) Prior Publication Data

US 2019/0171060 A1 Jun. 6, 2019

Related U.S. Application Data

(63) Continuation of application No. 15/793,680, filed on Oct. 25, 2017.

(30) Foreign Application Priority Data

Nov. 22, 2016 (CN) .......................... 2016 1 1039970

(51) Int. Cl.
*G02F 1/1335* (2006.01)
*G02F 1/1333* (2006.01)
(52) U.S. Cl.
CPC .............. *G02F 1/133512* (2013.01); *G02F 2001/133388* (2013.01); *G02F 2202/28* (2013.01)

(58) Field of Classification Search
CPC ... G02F 1/133512; G02F 2001/133388; G02F 2202/28; G02F 1/13394
See application file for complete search history.

(56) References Cited

U.S. PATENT DOCUMENTS

| 2006/0221275 | A1* | 10/2006 | Matsufuji | ................... | C08J 5/18 |
| | | | | | 349/96 |
| 2008/0297680 | A1* | 12/2008 | Hwang | ............. | G02F 1/133308 |
| | | | | | 349/58 |
| 2013/0027857 | A1* | 1/2013 | Jeong | ................ | G02F 1/133308 |
| | | | | | 361/679.01 |
| 2013/0070179 | A1* | 3/2013 | Kim | .................. | G02F 1/133512 |
| | | | | | 349/58 |
| 2013/0222719 | A1 | 8/2013 | Matsumoto et al. | | |
| 2013/0293804 | A1* | 11/2013 | Kim | .................. | G02F 1/133308 |
| | | | | | 349/58 |

(Continued)

FOREIGN PATENT DOCUMENTS

| CN | 102819986 A | 12/2012 |
| CN | 102902086 A | 1/2013 |
| CN | 2040092393 U | 12/2014 |

*Primary Examiner* — Phu Vu
(74) *Attorney, Agent, or Firm* — Muncy, Geissler, Olds & Lowe, P.C.

(57) ABSTRACT

A display device includes a display panel, a light shielding unit and a back plate. The display panel includes a first substrate, a second substrate and an upper polarizer. The first substrate is disposed corresponding to the second substrate. The upper polarizer is disposed on the second substrate. The light shielding unit is connected to the upper polarizer. The first substrate is disposed on the back plate.

18 Claims, 8 Drawing Sheets

(56) References Cited

U.S. PATENT DOCUMENTS

| | | | | |
|---|---|---|---|---|
| 2015/0241731 A1* | 8/2015 | Jeong | ............... | G02B 6/009 349/58 |
| 2015/0301266 A1* | 10/2015 | Araki | ............... | G02B 6/005 349/65 |
| 2017/0153386 A1* | 6/2017 | Kong | ............... | G02B 6/0056 |

* cited by examiner

DISPLAY DEVICE

CROSS REFERENCE TO RELATED APPLICATIONS

This application is a Continuation Application (CA) of an earlier filed, pending, application, having application Ser. No. 15/793,680 and filed on Oct. 25, 2017, the content of which, including drawings, is expressly incorporated by reference herein.

BACKGROUND

Technical Field

The present disclosure relates to a display device that can improve the light leakage issue.

Related Art

With the development of technologies, flat display devices have been widely applied to various fields. Due to the advantages such as low power consumption, less weight, compact size and less radiation, the liquid crystal display (LCD) devices have gradually replaced the traditional cathode ray tube (CRT) display devices and been applied to various electronic products, such as mobile phones, portable multimedia devices, notebook computers, liquid crystal TVs and liquid crystal screens.

The conventional LCD device includes a color filer (CF) substrate and a thin-film-transistor (TFT) substrate, which are disposed opposite to each other. The upper surface of the CF substrate is configured with a polarizer, and the lower surface of the TFT substrate is also configured with a polarizer. The polarizing axes of the two polarizers substantially have a phase difference of 90 degrees, and the light characteristics can be modulated by controlling the intensity of the electric field to bias the liquid crystals, thereby enabling the LCD device to display images.

In general, the area of the upper polarizer is smaller than the area of the upper surface of the CF substrate, and the area of the lower polarizer is smaller than the area of the lower surface of the TFT substrate. Accordingly, the polarizers may not fulfill the entire upper surface of the CF substrate or the entire lower surface of the TFT substrate. When the light emitted from the backlight module passes through the display panel, the light may not only pass through the polarizers but also the parts of the TFT substrate or the CF substrate, which is not covered by the polarizers (e.g. the edges of the CF substrate or the TFT substrate). This will cause the light leakage at the edges of the display panel and thus affect the display quality.

Therefore, it is desired to provide a display device that can prevent the light leakage issue of the display panel so as to improve the display quality.

SUMMARY

An objective of the disclosure is to provide a display device that can prevent the light leakage issue of the display panel so as to improve the display quality.

The present disclosure provides a display panel including a display panel, a light shielding unit, a supporting unit and a backlight module. The display panel includes a first substrate and a first polarizer. The first substrate has a first surface, and the first surface has a first active area and a first non-active area. The first non-active area is disposed adjacent to the first active area, and the first polarizer is disposed on the first active area. The light shielding unit is disposed on the first non-active area and connected to the first polarizer. The supporting unit is disposed corresponding to the light shielding unit. The backlight module is disposed corresponding to the display panel and includes an optical film. The supporting unit is disposed between the light shielding unit and the optical film, and the supporting unit contacts the light shielding unit and the optical film.

The present disclosure also provides a display device, which includes a display panel, a light shielding unit, a supporting unit and a backlight module. The display panel includes a first substrate, a second substrate, a first polarizer, and a second polarizer. The first substrate is disposed corresponding to the second substrate. The first substrate has a first surface away from the second substrate, and the first surface has a first active area and a first non-active area. The first non-active area is disposed adjacent to the first active area, and the first polarizer is disposed on the first active area. The second substrate has a second surface away from the first substrate, and the second surface has a second active area and a second non-active area. The second non-active area is disposed adjacent to the second active area, and the second polarizer is disposed on the second active area. The light shielding unit is disposed on the second non-active area of the second substrate and connected to the second polarizer. The supporting unit is disposed corresponding to the first non-active area of the first substrate. The backlight module is disposed corresponding to the display panel and includes an optical film. The supporting unit is disposed between the first substrate and the optical film, and the supporting unit contacts the first non-active area and the optical film.

The present disclosure further provides a display device including a display panel, a light shielding unit and a back plate. The display panel includes a first substrate, a second substrate and a polarizer. The first substrate is disposed corresponding to the second substrate. The second substrate has a surface away from the first substrate, and the surface has an active area and a non-active area. The non-active area is disposed adjacent to the active area, and the polarizer is disposed on the active area. The light shielding unit is disposed on the non-active area of the second substrate and connected to the polarizer. The first substrate is disposed on the back plate.

As mentioned above, in the display device of the disclosure, the light shielding unit is disposed on the first non-active area or the second non-active area, and the light shielding unit is connected to the first polarizer or the second polarizer. Thus, the light emitted toward the display panel can be blocked by the light shielding unit disposed on the first non-active area or the second non-active area. This configuration can prevent the light leakage issue of the display panel and improve the display quality.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements.

Moreover, the drawings of all implementation are schematic, and they do not mean the actual size and proportion. The terms of direction recited in the disclosure, for example up, down, left, right, front, or rear, only define the directions according to the accompanying drawings for the convenience of explanation but not for limitation. In addition, if one element is formed on, above, under, or below another element, these two elements can be directly contacted with each other or not directly contacted with each other but have an addition element disposed therebetween. The numeral descriptions, such as the first, the second and the third, are for identifying different components and are not for limiting the order thereof. The names of elements and the wording recited in the disclosure all have ordinary meanings in the art unless otherwise stated. Therefore, a person skilled in the art can unambiguously understand their meanings.

Figure 1A:
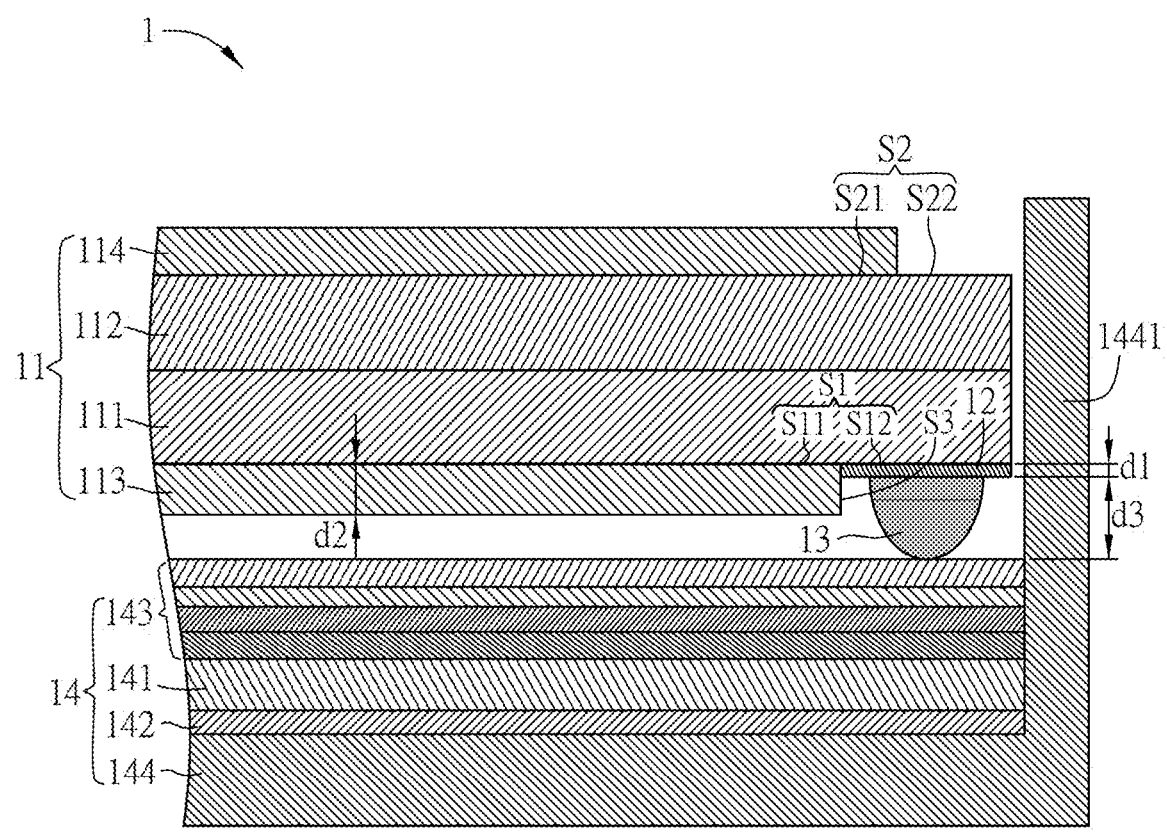
FIG. 1A is a sectional view of a part of a display device according to an embodiment of the disclosure.
Figure 1B:
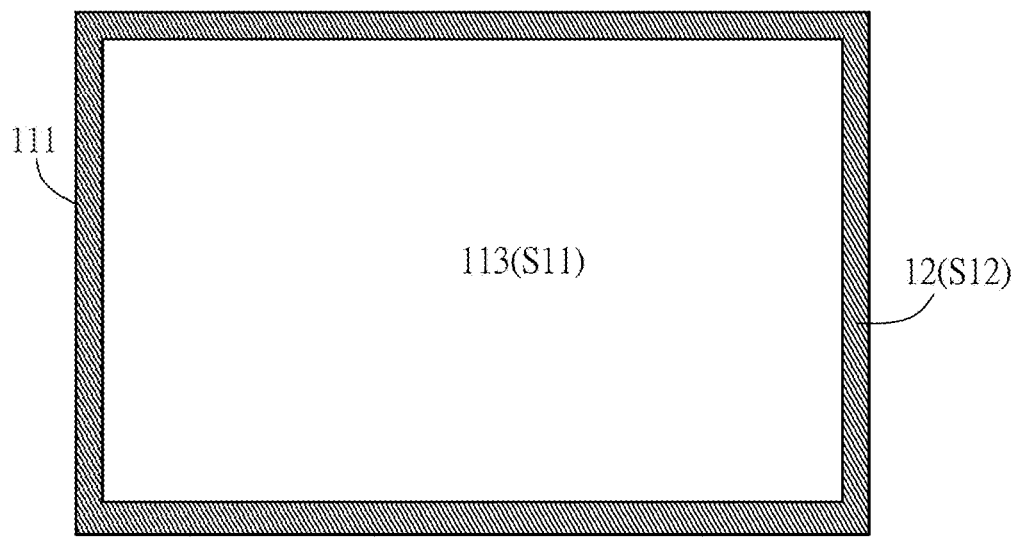
FIG. 1B is a top view of the display device of FIG. 1A showing the relative positions of the first substrate, the first polarizer and the light shielding unit.

FIG. 1A is a sectional view of a part of a display device 1 according to an embodiment of the disclosure, and FIG. 1B is a top view of the display device 1 of FIG. 1A showing the relative positions of the first substrate 111, the first polarizer 113 and the light shielding unit 12.

As shown in FIGS. 1A and 1B, the display device 1 is a LCD device, which includes a display panel 11, a light shielding unit 12, and a supporting unit 13 and a backlight module 14. The backlight module 14 is disposed corresponding to the display panel 11, and the light emitted from the backlight module 14 passes through the display panel 11 so as to display images. The display panel 11 can be an FFS (Fringe Field Switching) LCD panel, an IPS (In-plane switch) LCD panel, a TN (Twisted Nematic) LCD panel, a VA mode (Vertical Alignment mode) LCD panel, or any one of other types of LCD panels, and this disclosure is not limited.

As shown in FIG. 1A, the display panel 11 includes a first substrate 111, a second substrate 112, a liquid crystal layer (not shown), a first polarizer 113 and a second polarizer 114. The first substrate 111 is disposed opposite to the second substrate 112, and the liquid crystal layer is disposed between the first substrate 111 and the second substrate 112. In some embodiments, the first substrate 111 or the second substrate 112 can be made of a material containing glass, plastics or quartz, and this disclosure is not limited. In some embodiments, the first substrate 111 or the second substrate 112 can be a flexible substrate, a rigid substrate, or a rigid-flex board, and this disclosure is not limited. In some embodiments, the first substrate 111 or the second substrate 112 can be a capping layer or a barrier film, and this disclosure is not limited.

In this embodiment, the first substrate 111 is a TFT (thin-film-transistor) substrate, and the second substrate 112 is a CF (color filter) substrate. In other embodiments, the black matrix of the CF substrate can be formed on the TFT substrate, and the first substrate 111 becomes a BOA (BM on array) substrate. Alternatively, the color filter layer of the CF substrate can be formed on the TFT substrate, and the first substrate 111 becomes a COA (color filter on array) substrate. In some embodiments, the first substrate 111 can be a CF substrate and the second substrate 112 can be a TFT substrate. This disclosure is not limited.

In this embodiment, the first polarizer 113 is a lower polarizer, and the second polarizer 114 is an upper polarizer. In another embodiment, the first polarizer 113 can be an upper polarizer, and the second polarizer 114 can be a lower polarizer. This disclosure is not limited. In this embodiment, the first polarizer 113 (lower polarizer) is disposed at one side of the first substrate 111 away from the second substrate 112, and the second polarizer 114 (upper polarizer) is disposed at one side of the second substrate 112 away from the first substrate 111. In this case, the first polarizer 113 is disposed on the first surface S1 (lower surface) of the first substrate 111, and the second polarizer 114 is disposed on the second surface S2 (upper surface) of the second substrate 112. The polarizing axes of the first polarizer 113 and the second polarizer 114 substantially have a phase difference of 90 degrees, and the characteristics of the light emitted from the backlight module 14 can be modulated by controlling the intensity of the electric field to bias the liquid crystals, thereby enabling the display panel 11 to display images. In other embodiments, other polarizers of different designs can also be applied based on the requirement, and this disclosure is not limited.

The first surface S1 of the first substrate 111 has a first active area S11 and a first non-active area S12. The first non-active area S12 is disposed adjacent to the first active area S11, and the first polarizer 113 is disposed on the first active area S11. In other words, the first active area S11 is an area of the first surface S1 of the first substrate for attaching the first polarizer 113, and the residual area of the first surface S1 of the first substrate 111, which is not attached with the polarizer, is the first non-active area S12. Since the area of the first polarizer 113 is smaller than the area of the first surface S1, a part of the first surface S1 is not covered by the polarizer when attaching the first polarizer 113 on the first surface S1, and the residual area of the first surface S1, which is not attached with the polarizer, is the first non-active area S12. As shown in FIG. 1B, the first non-active area S12 of the embodiment is disposed around the first active area S11 of the first substrate 111 (e.g. four sides of the first active area S11). In other embodiments, the first non-active area S12 can be disposed at one side, two sides, or three sides of the first surface S1 of the first substrate 111. This disclosure is not limited.

Similarly, the second surface S2 of the second substrate 112 has a second active area S21 and a second non-active area S22. The second non-active area S22 is disposed adjacent to the second active area S21, and the second polarizer 114 is disposed on the second active area S21. In other words, since the area of the second polarizer 114 is smaller than the area of the second surface S2, a part of the second surface S2 is not covered by the polarizer when attaching the second polarizer 114 on the second surface S2, and the residual area of the second surface S2, which is not attached with the polarizer, is the second non-active area S22. In this embodiment, the second non-active area S22 is disposed around the second active area S21 of the second substrate 112 (e.g. four sides of the second active area S21). In other embodiments, the second non-active area S22 can be disposed at one side, two sides, or three sides of the second surface S2 of the second substrate 112. This disclosure is not limited.

As shown in FIG. 1A, the light shielding unit 12 is disposed on the first non-active area S12 of the first surface S1 and connected to the first side surface S3 of the first polarizer 113. As shown in FIG. 1B, the light shielding unit 12 is disposed on the first non-active area S12 and connected to four sides of the first polarizer 113. In more detailed, the light shielding unit 12 is disposed on the first non-active area S12, so the first polarizer 113 and the light shielding unit 12 is substantially located on the first surface S1 of the first substrate 111. In other embodiments, the light shielding unit 12 can be disposed at one side, two sides or three sides of the first non-active area S12, or it can include a plurality of separated segments disposed on the first surface S1. This disclosure is not limited.

Figure 1C:
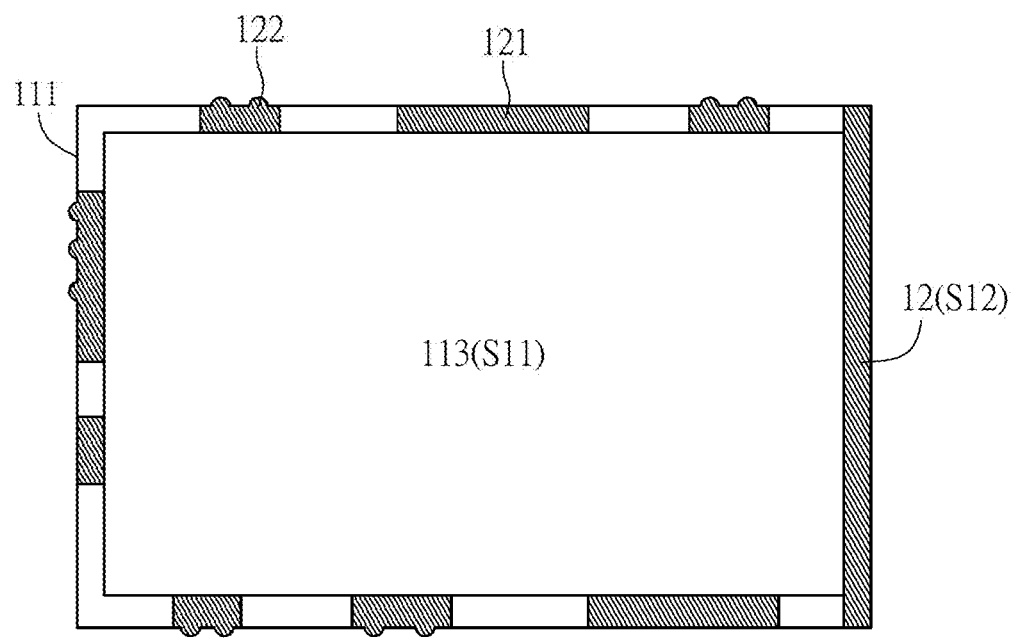
FIG. 1C is a top view of a display device of another embodiment showing the relative positions of the first substrate, the first polarizer and the light shielding unit.

As shown in FIG. 1C, the light shielding unit 12 includes a plurality of separated segments disposed at four sides of the first non-active area S12. In one embodiment, the side of some segments (e.g. the segment 121) of the light shielding unit 12 can be a smooth straight line. In one embodiment, the side of some segments (e.g. the segment 122) of the light shielding unit 12 can be an irregular surface. In one embodiment, the segments of the light shielding unit 12 may have different lengths, and one side of the first non-active area S12 can be configured with a plurality of segments of the same length or different lengths. In one embodiment, the surface of the light shielding unit 12, which contacts with the supporting unit 13, can be a smooth surface or an irregular surface, and this disclosure is not limited. The light shielding unit of the disclosure can be the combinations of any of above aspects, and this disclosure is not limited.

The light shielding unit 12 is made of insulation material such as, for example but not limited to, acrylic glue. The resistance of the light shielding unit 12 is between $10^8\Omega$ and $10^{15}\Omega$ ($10^8\Omega \leq$ resistance $\leq 10^{15}\Omega$). In other embodiments, the resistance of the light shielding unit 12 can be between $10^{10}\Omega$ and $10^{15}\Omega$ ($10^{10}\Omega \leq$ resistance $\leq 10^{15}\Omega$). In order to provide the light shielding effect, the light shielding unit 12 is black, and this disclosure is not limited. In other embodiments, the light shielding unit 12 can be gray or other color with low transmittance. The transmittance can be defined by the optical density (OD) of the material, which can be measured by illuminometer. In this embodiment, the optical density of the light shielding unit 12 is, for example, greater than or equal to 1 and is less than or equal to 4 ($1 \leq OD \leq 4$). In other embodiments, the optical density of the light shielding unit 12 can be, for example, greater than or equal to 2 and is less than or equal to 4 ($2 \leq OD \leq 4$). If the optical density of 2 represents the transmittance of $1/100$, and the optical density of 4 represents the transmittance of $1/10000$.

In some embodiment, the light shielding unit 12 is made of black light shielding glue or light shielding tape, and this disclosure is not limited. The viscosity of the light shielding glue can be greater than or equal to 100 CP (centipoise) and be smaller than or equal to 1000 CP (100 CP $\leq$ viscosity $\leq$ 1000 CP). In other embodiments, the viscosity of the light shielding glue can be greater than or equal to 350 CP and be smaller than or equal to 750 CP (350 CP $\leq$ viscosity $\leq$ 750 CP). In other embodiment, the viscosity of the light shielding glue can be greater than or equal to 400 CP and be smaller than or equal to 500 CP (400 CP $\leq$ viscosity $\leq$ 500 CP). For example, the viscosity of the light shielding glue can be 450 CP. The light shielding glue can be disposed on the first non-active area S12 by coating. In some embodiment, in order to ensure the contact between the first polarizer 113 and the first side surface S3, the light shielding glue can be applied from the first non-active area S12 to the covering layer (not shown) of the first polarizer 113. Since the first side surface S3 of the first polarizer 113 has a certain thickness, the light shielding glue may have a gap during the coating process due to this thickness of the first side surface S3, and be remained on the first non-active area S12 and the covering layer of the first polarizer 113. Accordingly, the light shielding glue applied on the first polarizer 113 can be easily removed by tearing off the covering layer of the first polarizer 113 after the solidification of the light shielding glue. Thus, the formed light shielding glue can be stopped at and fulfill the entire first side surface S3 of the first polarizer 113. Afterwards, the light shielding glue disposed on the first non-active area S12 is solidified to form the light shielding unit 12. In other embodiments, the light shielding glue can be disposed on the entire first non-active area S12 or on a part of the first non-active area S12, and this disclosure is not limited. In addition, the light shielding unit can be formed by other methods such as attaching, and this disclosure is not limited.

The thickness of the light shielding unit 12 is smaller than the thickness of the first polarizer 113. In some embodiment, as shown in FIG. 1A, the thickness d1 of the light shielding unit 12 is greater than or equal to $1/12$ of the thickness d2 of the first polarizer 113 and is smaller than or equal to the thickness d2 of the first polarizer 113 ($d2/12 \leq d1 \leq d2$). In other embodiments, the thickness d1 of the light shielding unit 12 can be greater than or equal to $1/12$ of the thickness d2 of the first polarizer 113 and be smaller than or equal to $1/2$ of the thickness d2 of the first polarizer 113 ($d2/12 \leq d1 \leq d2/2$). In one embodiment, the thickness of the first polarizer 113 is, for example, 180 μm, and the thickness of the light shielding unit 12 is greater than or equal to 15 μm and is smaller than or equal to 20 μm. In some embodiments, the light shielding unit 12 is formed by coating a light shielding glue, so the surface of the light shielding unit 12 may be not a planar surface. Thus, the above-mentioned thickness of the light shielding unit 12 is the "average thickness" of the light shielding unit 12.

As shown in FIG. 1A, the supporting unit 13 is disposed corresponding to the light shielding unit 12, and the supporting unit 13 is positioned between the backlight module 14 and the display panel 11. In this embodiment, the supporting unit 13 is disposed between the light shielding unit 12 and the optical film 143, and the supporting unit 13 contacts the light shielding unit 12 and the optical film 143 of the backlight module 14 for supporting the display panel 11. Herein, the supporting unit 13 can be a spacer or other components for supporting the display panel 11 or configuring between the display panel 11 and the backlight module 14. This disclosure is not limited. In addition, the supporting unit 13 can be made of, for example but not limited to, UV glue or tape. The thickness d3 of the supporting unit 13 can be the distance protruding beyond the light shielding unit 12 towards the backlight module 14. The sum of the thickness d1 of the light shielding unit 12 and the thickness d3 of the supporting unit 13 is greater than or equal to the thickness d2 of the first polarizer 113 (($d1+d3) \geq d2$). In some embodiments, the supporting unit 13 can cover the entire light shielding unit 12 or a part of the light shielding unit 12. In some embodiments, the supporting unit 13 can be a single piece of component, a component having multiple segments, or composed of a plurality of parts, and this disclosure is not limited. The above-mentioned shapes of the supporting unit 13 are for illustrations, and in other embodiments, the supporting unit 13 may have any of other shapes. This disclosure is not limited.

The backlight module 14 further includes an optical unit 141, a reflective unit 142, an optical film 143, and a back plate 144. When the backlight module 14 is an edge-type backlight module, the optical unit 141 is a light guiding plate. The optical unit 141 can be made of transparent materials, such as acrylic resin, polycarbonate, polyethylene resin, or glass, and this disclosure is not limited. In addition, the cross-section of the optical unit 141 may have a plate shape, a wedge shape, or other shapes, and this disclosure is not limited. In this embodiment, the backlight module 14 is an edge-type backlight module, and the optical unit 141 is a light guiding plate. Accordingly, the light-emitting unit (not shown) can emit light, and the light enters the light guiding plate through the light input surface (side surface) and is then outputted through the light output surface (top surface) of the light guiding plate, thereby providing a surface light to the display panel 11. When the backlight module 14 is a direct-type backlight module, the optical unit 141 is a LED matrix layer, and this disclosure is not limited.

The reflective unit 142 is disposed on the bottom surface of the optical unit 141 for reflecting the light outputted from the bottom surface of the optical unit 141 back to the optical unit 141 to increase the utility of the light. The reflective unit 142 can be a reflective layer (e.g. a metal coating layer) or a reflective plate. In this embodiment, the reflective unit 142 is a reflective plate. The reflective unit 142 includes a reflective material such as metal, metal oxide, high reflective paint (white paint), or their combinations, and this disclosure is not limited.

The optical film 143 is disposed on the light output surface (the top surface) of the optical unit 141. In this embodiment, the backlight module 14 includes four stacked optical films (all have the same reference number 143) disposed on the optical unit 141. In other embodiments, the backlight module 14 may have multiple optical films of other numbers, and this disclosure is not limited. The optical film 143 is, for example but not limited to, a diffuser, a 90° collector, a 0° collector, a prism sheet, a brightness enhancement film, or other optical films, or any of their combinations. The optical film(s) 143 can transform the light outputted from the optical unit 141 into a uniform surface light source.

The back plate 144 is configured to support the optical unit 141, the reflective unit 142 and the optical film 143 as well as the display panel 11 for providing the protections to collision, electromagnetic wave, electric shock, or moisture. In this embodiment, the back plate 144 is made of plastics, metals, alloys, polyesters, carbon fibers, or any of their combinations, and this disclosure is not limited. In some embodiments, the back plate 144 can be a supporting frame, which is made of metals, alloys, or plastics, and this disclosure is not limited.

In the display device 1 of this embodiment, the light shielding unit 12 is disposed on the first non-active area S12 of the first substrate 111 and is connected to the first side surface S3 of the first polarizer 113, so the light emitted from the backlight module 14 to the display panel 11 can be blocked by the light shielding unit 12 disposed on the first non-active area S12. Accordingly, the light cannot pass through the edges of the display panel 11 and irradiate the internal components (not shown) of the display panel 11. This configuration can prevent the light leakage issue of the display panel 11 and thus improve the display quality.

To be noted, although the light shielding unit 12 is disposed on the first non-active area S12 of the first substrate 111 and is connected to the first side surface S3 of the first polarizer 113, a gap may exist between the light shielding unit 12 (the side surface) and the side wall 1441 of the back plate 144 of the backlight module 14, which may cause the light leakage. Accordingly, in some embodiments, the light shielding unit 12 may extend from the first non-active area S12 of the first substrate 111 to the side wall 1441 of the back plate 144 and connect to the side wall 1441 (not shown). This configuration can prevent the light from passing through the gap between the side wall 1441 and the light shielding unit 12 (light leakage). In some embodiments, the back plate 144 may be attached to the side surface of the display panel 11 tightly and directly connected to the light shielding unit 12, and this disclosure is not limited.

The metal oxide thin-film transistors are the commonly used driving unit for the display panel. However, the metal oxide thin-film transistors may easily generate threshold voltage shifting after irradiated by light, which will cause the hotspots of the display panel. In this disclosure, the metal oxide thin-film transistors disposed at the non-active area (e.g. the metal oxide thin-film transistors of the gat driver on panel (GOP)) can be covered, and the undesired light leaking from the non-active area to the active area to affect the metal oxide thin-film transistors disposed at the active area can be prevented. This disclosure can avoid the light leakage through the non-active area of the panel and prevent the hotspots, and this disclosure is not limited. The above-mentioned metal oxide is, for example, IGZO (Indium Gallium Zinc Oxide).

Figure 1D:
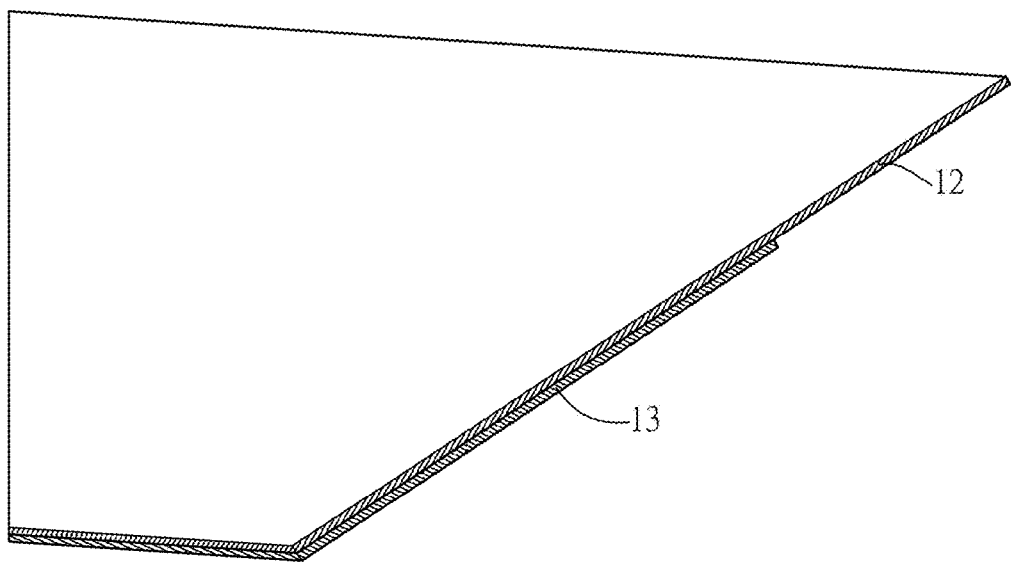
FIG. 1D is a perspective diagram showing parts of the light shielding unit and the supporting unit according to an embodiment of the disclosure.
Figure 1E:
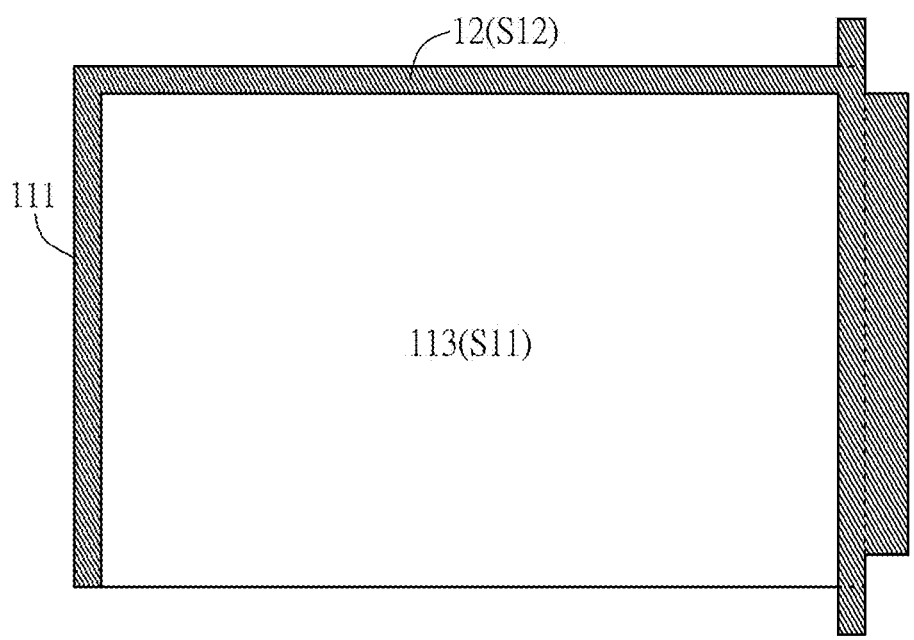
FIG. 1E is a top view of a display device of another embodiment showing the relative positions of the first substrate, the first polarizer and the light shielding unit.

In other embodiments, the light shielding unit 12 can be formed by attaching a light shielding tape. FIG. 1D is a perspective diagram showing parts of the light shielding unit 12 and the supporting unit 13 according to an embodiment of the disclosure, and FIG. 1E is a top view of a display device of another embodiment showing the relative positions of the first substrate 111, the first polarizer 113 and the light shielding unit 12.

In the embodiment of FIG. 1D, the light shielding unit 12 is, for example but not limited to, a single-sided adhesive, and the supporting unit 13 is, for example but not limited to, a spacer or a buffer for providing a spacing or buffering function. In addition, as shown in FIG. 1E, the first non-active area S12 is located on the top side, the left side and the right side of the first surface S1 of the first substrate 111, and the bottom side of the first surface S1 does not configure with the non-active area. Moreover, in the top view of FIG. 1E, a part of the light shielding unit 12 protrudes beyond the top side, the bottom side and the right side of the first surface S1. In practice, in order to provide the light shielding and fixing functions, the part of the light shielding unit 12 protruding beyond the top side, the bottom side and the right side of the first surface S1 is bent toward the backlight module and attached to the backlight module, so it is not shown in the top view. In this embodiment, the light shielding unit 12 and the supporting unit 13 are disposed at the right side of the first substrate 111, and a part of the light shielding unit 12 protrudes beyond the top side, the bottom side and the right side of the first surface S1. The protruding part of the light shielding unit 12 can be bent toward and attached to the backlight module, so that the light shielding unit 12 can be fixed on the backlight module. The protruding part of the light shielding unit 12 of FIG. 1E is for an example. In other embodiments, the light shielding unit 12 may protrude beyond the other sides (e.g. the left side) of the first surface S1. The light shielding unit 12 may have the same protruding configuration, or any combination of the top side, the bottom side and the right side, and this disclosure is not limited.

FIGS. 2A to 2G are schematic diagrams showing the display devices 1a~1g of different aspects.

Figure 2A:
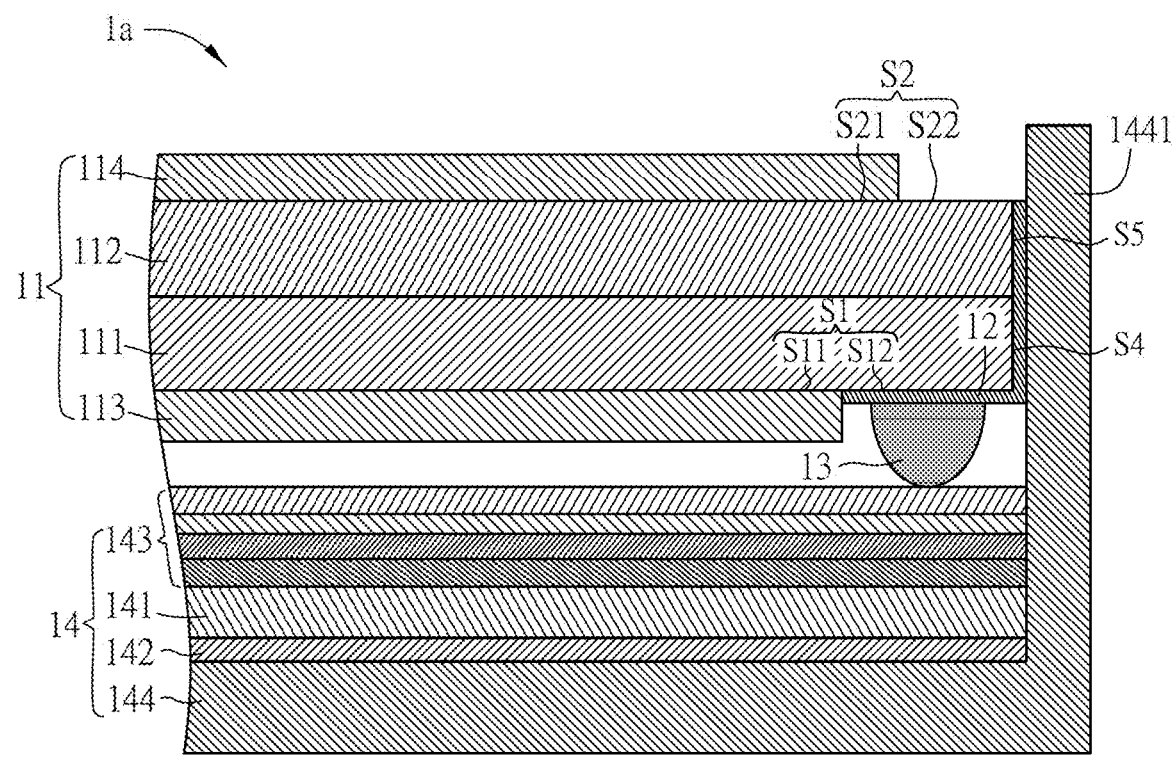
FIGS. 2A to 2G are schematic diagrams showing the display devices of different aspects.

Different from the display device 1 of FIG. 1A, the light shielding unit 12 of the display device 1a of FIG. 2A is disposed on the first non-active area S12 of the first substrate 111 and is further disposed on the second side surface S4 of the first substrate 111 and extended to the third side surface S5 of the second substrate 112. In other words, the light shielding unit is disposed on the second side surface S4 of the first substrate 111 and the third side surface S5 of the second substrate 112. Accordingly, the light shielding unit 12 can block the light emitted from the backlight module 14 to the first non-active area S12 and further block the light emitted from the backlight module 14 to the interval between the second side surface S4 of the first substrate 111 and the side wall 1441 of the back plate 144.

Figure 2B:
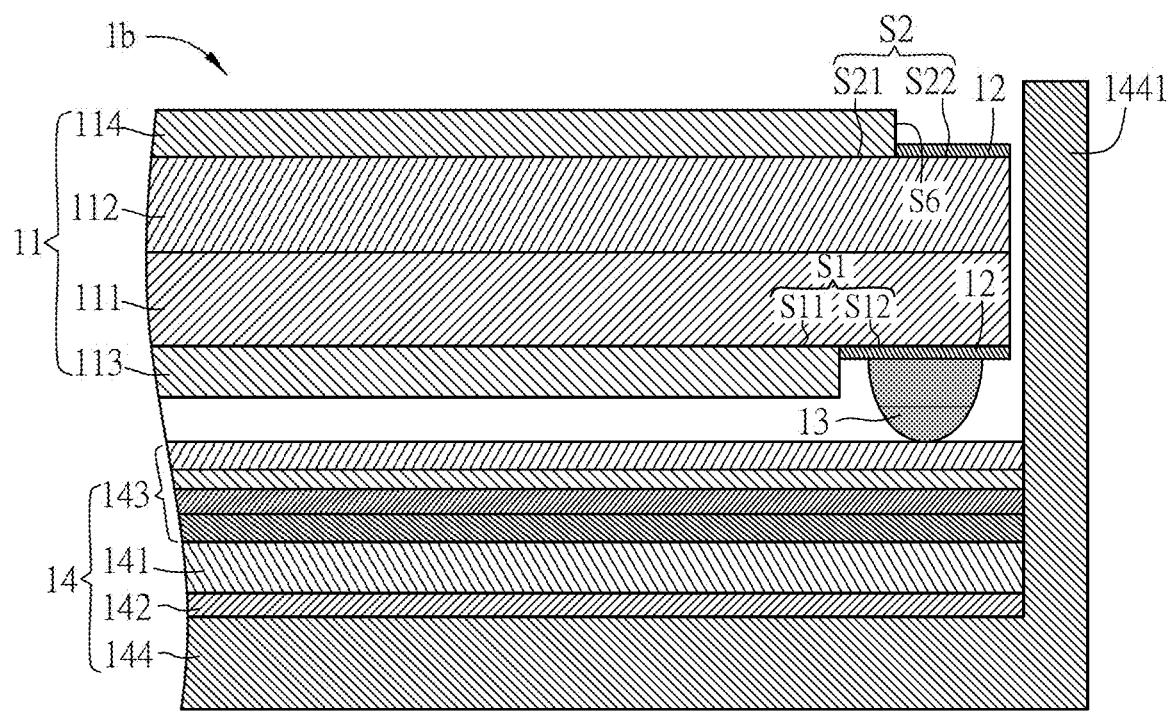

Different from the display device 1 of FIG. 1A, the light shielding unit 12 of the display device 1b of FIG. 2B is disposed on the first non-active area S12 of the first substrate 111 and is further disposed on the second non-active area S22 of the second substrate 112 and connected to the fourth side surface S6 of the second polarizer 114. In some embodiments, the light shielding unit 12 is disposed on the second non-active area S22 and connected to, for example, four fourth side surfaces S6 of the second polarizer 114. In other embodiments, the light shielding unit 12 is disposed on a part of the second non-active area S22, and this disclosure is not limited. In addition, the light shielding unit 12 can be extended from the first non-active area S12 of the first substrate 111 to the side wall 1441 of the back plate 144 and connected to the side wall 1441 (not shown). This configuration can prevent the light leakage through the gap between the side wall 1441 and the side surface of the light shielding unit 12.

Figure 2C:
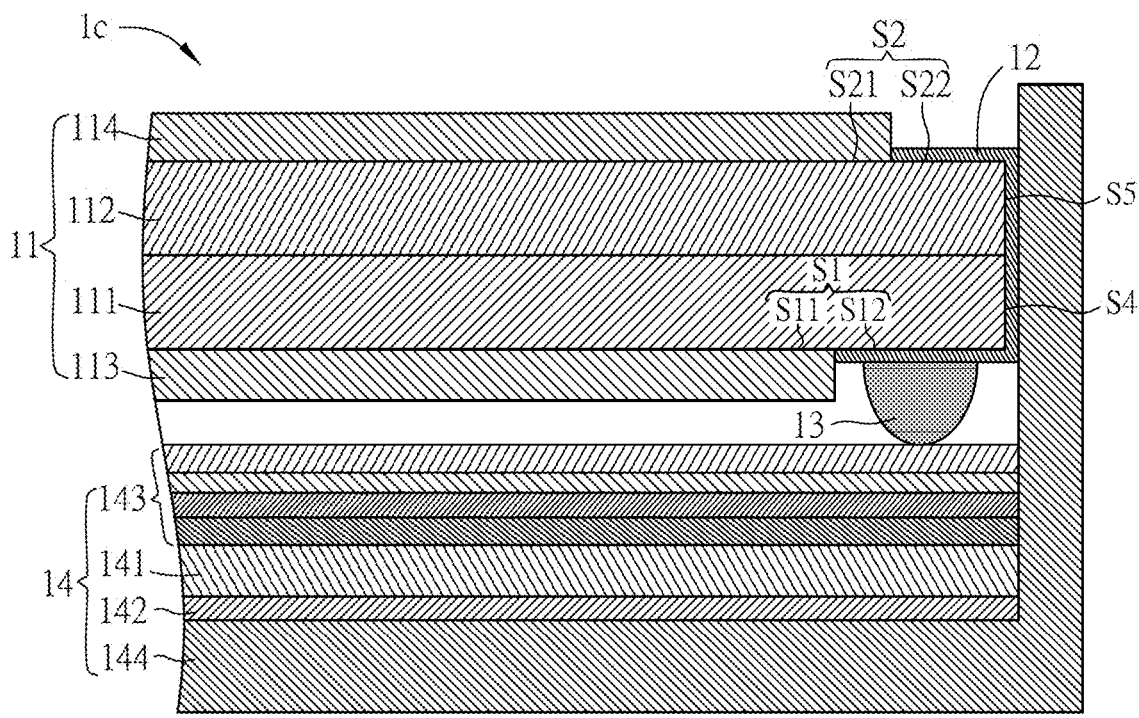

Different from the display device 1b of FIG. 2B, the light shielding unit 12 of the display device 1c of FIG. 2C is further disposed on the second side surface S4 of the first substrate 111 and the third side surface S5 of the second substrate 112.

Figure 2D:
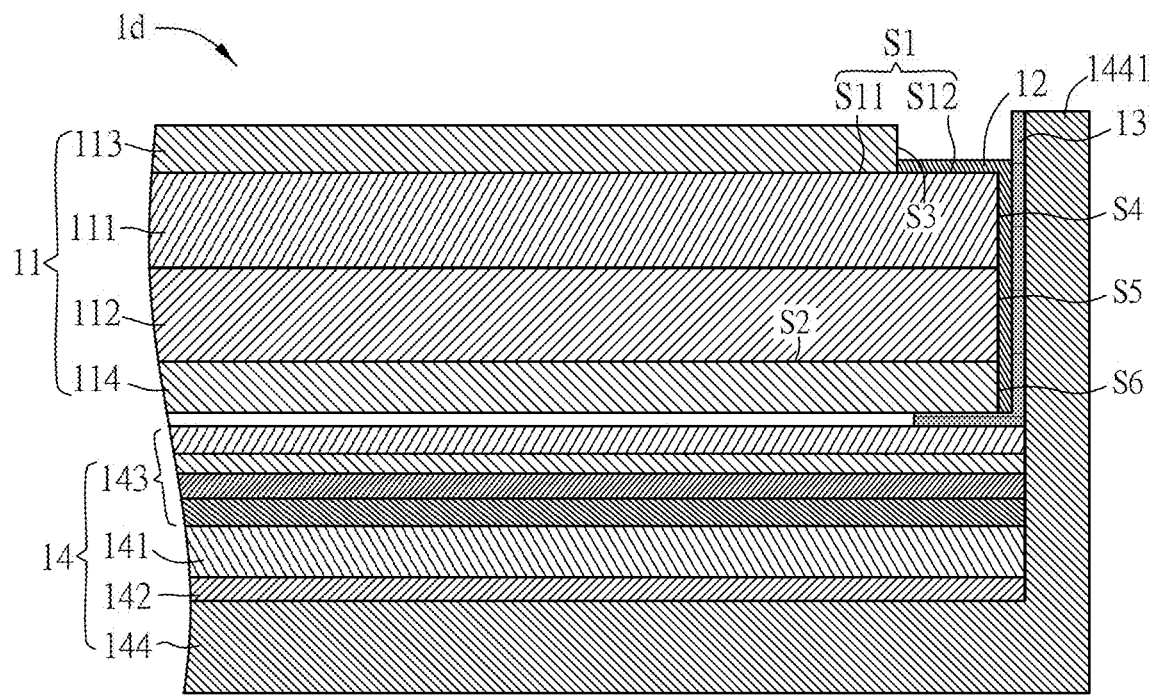

Different from the display device 1 of FIG. 1A, the first substrate 111 of the display device 1d of FIG. 2D is a CF substrate, and the second substrate 112 is a TFT substrate. In addition, the light shielding unit 12 is disposed on the first non-active area S12 of the first substrate 111 (CF substrate) and connected to the first side surface S3 of the first polarizer 113, and is further extended to the second side surface S4 of the first substrate 111, the third side surface S5 of the second substrate 112, and the further side surface S6 of the second polarizer 114. Moreover, the supporting unit 13 of this embodiment is, for example, a sealant and is disposed between the side wall 1441 and the light shielding unit 12. The supporting unit 13 contacts the side wall 1441, the light shielding unit 12, the second polarizer 114 and the optical film 143 of the backlight module 14, so that the display panel 11 can be carried by the backlight module 14 via the supporting unit 13, and the backlight module 14 is disposed opposite to the display panel 11. In this embodiment, the supporting unit 13 has a reverse L shape. A part of the supporting unit 13 is disposed between the light shielding unit 12 and the side wall 1441 of the back plate 144, and a part of the supporting unit 13 is disposed between the second polarizer 114 and the optical film 143. In addition, the second polarizer 114 is fully attached on the second surface S2 of the second substrate 112. In other words, the area of the second polarizer 114 is similar to the area of the second substrate 112, and the second non-active area S22 is almost not existed.

Figure 2E:
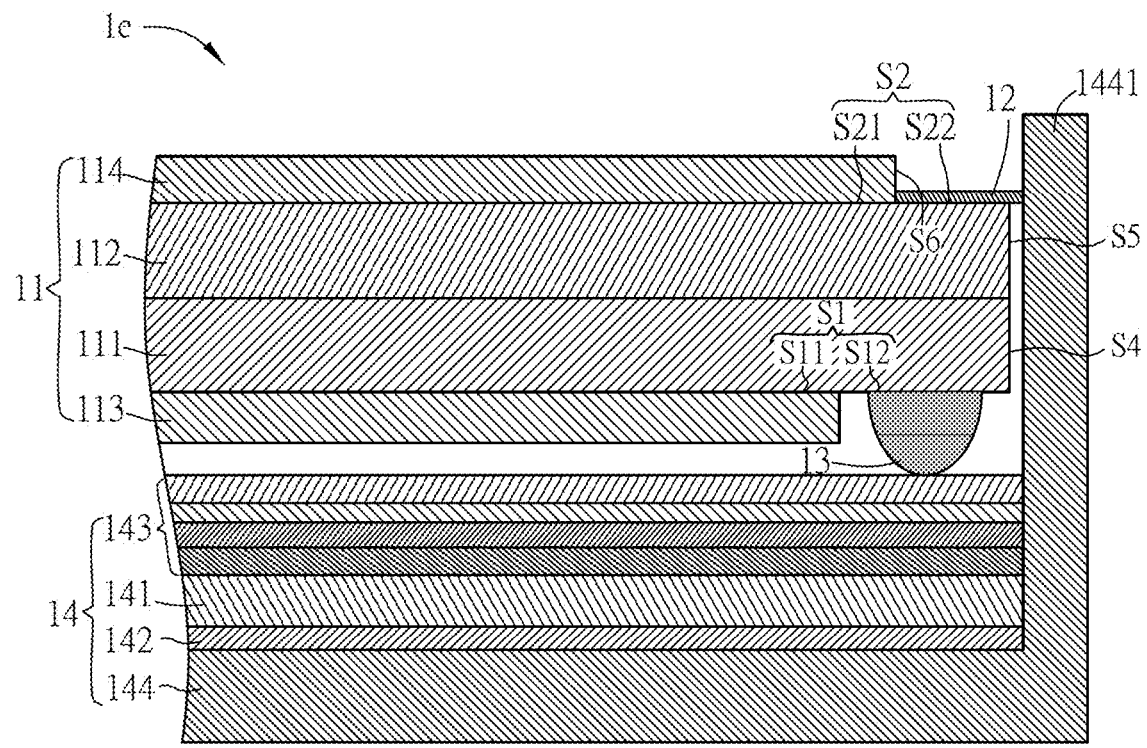

Similar to the display device 1a of FIG. 1A, the display device 1e of FIG. 2E includes a display panel 11, a light shielding unit 12, a supporting unit 13 and a backlight module 14. In this embodiment, the first polarizer 113 is disposed on the first active area S11 of the first substrate 111, and the second polarizer 114 is disposed on the second active area S21 of the second substrate 112. The first substrate 111 is a TFT substrate, and the second substrate 112 is a CF substrate. Different from the display device 1a, the light shielding unit 12 of this embodiment is disposed on the second non-active area S22 of the second substrate 112, and connected to the fourth side surface S6 of the second polarizer 114. Besides, the light shielding unit 12 extends from the second non-active area S22 to the side wall 1441 of the back plate 144 and connects to the side wall 1441. This configuration can prevent the light from passing through the gap between the side wall 1441 and the third side surface S5 or the second side surface S4, which may cause the undesired light leakage. The light shielding unit 12 can be disposed on the entire second non-active area S22 of the second substrate 112 (CF substrate) or on a part of the second non-active area S22 of the second substrate 112, and this disclosure is not limited. In addition, the supporting unit 13 of this embodiment can be correspondingly disposed on the first non-active area S12 of the first substrate 111 and located between the first substrate 111 and the optical film 143, and the supporting unit 13 contacts the first non-active area S12 and the optical film 143.

Figure 2F:
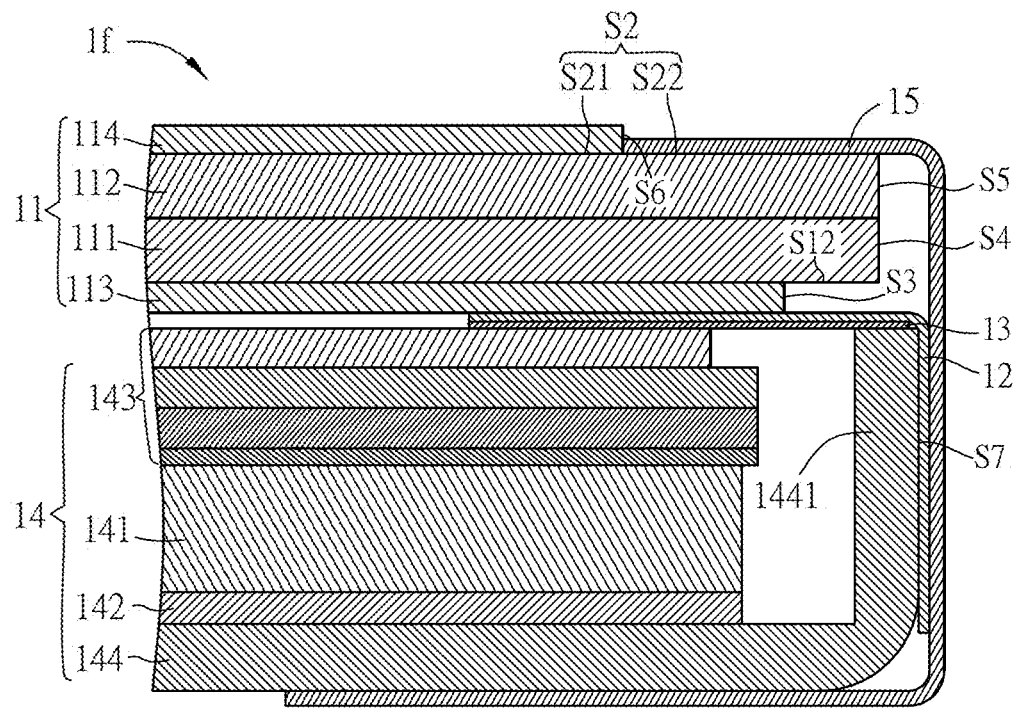

As shown in FIG. 2F, the light shielding unit 12 and the supporting unit 13 of this embodiment are corresponding to the embodiments of FIGS. 1D and 1E. In this case, the light shielding unit 12 is a single-sided adhesive tape, and the supporting unit 13 is a spacer or a buffer. The light shielding unit 12 is connected to the supporting unit 13 and the lower surface of the first polarizer 113, and the supporting unit 13 is disposed corresponding to the light shielding unit 12. The supporting unit 13 can be disposed between the light shielding unit 12 and the optical film 143 of the backlight module 14, and the supporting unit 13 contacts the light shielding unit 12 and the optical film 143. In addition, the back plate 144 has a side wall 1441. In this embodiment, the part of the side wall 1441 of the back plate 144 extending to the display panel 11 is shorter, and the height thereof is, for example, equal to the height of the optical film 143. The supporting unit 13 is disposed between the side wall 1441 and the light shielding unit 12, and the supporting unit 13 contacts the side wall 1441 and the light shielding unit 12. In this embodiment, the light shielding unit 12 further extends from the place above the supporting unit 13 to the place above the side wall 1441 of the back plate 144, and is then bent downwardly. Thus, the light shielding unit 12 can be disposed on the fifth side surface S7 of the side wall 1441, which is away from the optical film 143, and attached to the side wall 1441. Accordingly, the light shielding unit 12 can block the light emitted from the backlight module 14 to the display panel 11, and the light leakage issue of the display panel 11 can be prevented so as to improve the display quality. In other embodiments, on side of the light shielding unit 12 facing the display panel 11 can be configured with an adhesive layer (not shown) for enhancing the connecting strength between the display panel 11 and the backlight module 14. The adhesive layer can be disposed on a part of the light shielding unit 12 to be adhered to other components, and this disclosure is not limited. In some embodiments, the light shielding unit 12 can be disposed on the first non-active area S12 of the first substrate 111 and contacts the first side surface S3 of the first polarizer 113. The supporting unit 13 is disposed between the first polarizer 113 and the optical film 143 and contacts the first polarizer 113 and the optical film 143. This disclosure is not limited.

In addition, the display device 1f of this embodiment further includes a fixing unit 15. The fixing unit 15 is an exposed component and contacts the fourth side surface S6 of the second polarizer 114. The fixing unit 15 can extend from the fourth side surface S6 and disposed between the display panel 11 and the side surface of the backlight module 14, and cover a part of the bottom surface of the back plate 144. Thus, the light shielding unit 12 is further disposed between the side wall 1441 and the fixing unit 15, and the light shielding unit 12 contacts the side wall 1441 and the fixing unit 15. In other embodiments, the fixing unit 15 and the fourth side surface S6 of the second polarizer 114 may have a gap therebetween, and this disclosure is not limited. The configuration of the fixing unit 15 can enhance the connecting strength between the display panel 11 and the backlight module 14, or make the display device 1f with a beautiful appearance.

Figure 2G:
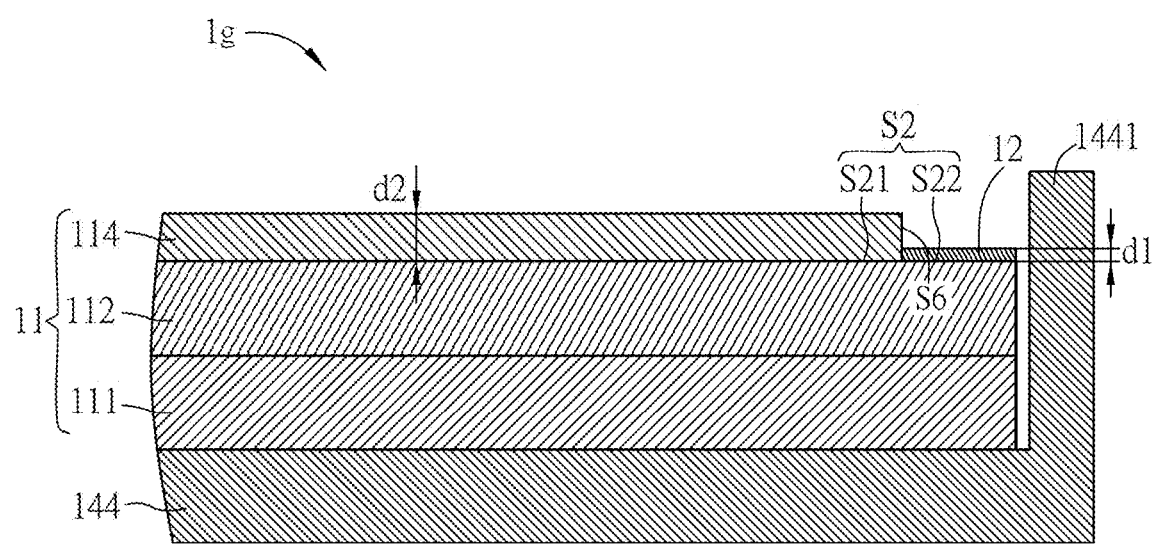

As shown in FIG. 2G, the display device 1g of this embodiment is an OLED (organic light-emitting diode) display device, which includes a display panel 11, a light shielding unit 12 and a back plate 144.

The display panel 11 includes a first substrate 111, a second substrate 112 and a polarizer 114. The first substrate 111 is disposed opposite to the second substrate 112. A display intermedium layer is disposed between the first substrate 111 and the second substrate 112. In this embodiment, the first substrate 111 can be a TFT substrate, the display intermedium layer is an OLED layer (not shown), and the second substrate 112 is a protection substrate (or a cover layer) for protecting the OLED layer and the TFT substrate from the external moisture and dusts. In some embodiments, the first substrate 111 or the second substrate 112 can be a flexible board, a rigid board or a flex-rigid board, and this disclosure is not limited.

The second substrate 112 has a surface S2 away from the first substrate 111, and the surface S2 has an active area S21 and a non-active area S22. The non-active area S22 is disposed adjacent to the active area S21, and the polarizer 114 is disposed on the active area S21. In other words, since the area of the polarizer 114 is smaller than the area of the surface S2, a part of the surface S2 is not covered by the polarizer when attaching the polarizer 114 on the surface S2, and the residual area of the surface S2, which is not attached with the polarizer, is the non-active area S22. In this embodiment, the non-active area S22 is disposed around the active area S21 of the second substrate 112 (e.g. four sides of the active area S21). In other embodiments, the non-active area S22 can be disposed at one side, two sides, or three sides of the surface S2 of the second substrate 112. This disclosure is not limited. In addition, the polarizer 114 is, for example but not limited to, a ¼λ circular polarizer for improving the display quality of the display device 1g.

In one embodiment, the viscosity of the light shielding glue (the light shielding unit 12) can be greater than or equal to 100 CP and be smaller than or equal to 1000 CP (100 CP≤viscosity≤1000 CP). The thickness $d1$ of the light shielding unit 12 is smaller than or equal to the thickness $d2$ of the polarizer 114. In one embodiment, the thickness $d1$ of the light shielding unit 12 is greater than or equal to 0 and is smaller than or equal to the thickness $d2$ of the polarizer 114 ($0 \leq d1 \leq d2$). In one embodiment, the thickness $d1$ of the light shielding unit 12 is greater than or equal to 0 and is smaller than or equal to ½ of the thickness $d2$ of the polarizer 114 ($0 \leq d1 \leq d2/2$). In one embodiment, the thickness $d1$ of the light shielding unit 12 is greater than or equal to 1/30 of the thickness $d2$ of the polarizer 114 and is smaller than or equal to ½ of the thickness $d2$ of the polarizer 114 ($d2/30 \leq d1 \leq d2/2$). In other embodiments, the thickness $d1$ of the light shielding unit 12 is greater than or equal to 1/30 of the thickness $d2$ of the polarizer 114 and is smaller than or equal to ⅓ of the thickness $d2$ of the polarizer 114 ($d2/30 \leq d1 \leq d2/3$). In one embodiment, the thickness of the light shielding unit 12 is greater than or equal to 15 µm and is smaller than or equal to 20 µm. In some embodiments, the light shielding unit 12 is formed by coating a light shielding glue, so the surface of the light shielding unit 12 may be not a planar surface. Thus, the above-mentioned thickness of the light shielding unit 12 is the "average thickness" of the light shielding unit 12. The other technical features (e.g. the resistance, viscosity, and the likes) of the light shielding unit 12 of this embodiment can be referred to the light shielding unit 12 of FIG. 1A, so the detailed descriptions thereof will be omitted.

In addition, the light shielding unit 12 can be disposed on the non-active area S22 of the second substrate 112, and the light shielding unit 12 is connected to the fourth surface S6 of the polarizer 114 and is not extended to the back plate 144. In some embodiments, as shown in FIG. 2E, the light shielding unit 12 extends from the non-active area S22 to the side wall 1441 of the back plate 144 and connects to the side wall 1441. This configuration can prevent the light from passing through the gap between the side wall 1441 and the side surface of the first substrate 111, which may cause the undesired light leakage. In this embodiment, the light shielding unit 12 is formed by coating the light shielding glue, and is an additional component other than the black matrix (BM) disposed inside the display panel 11, which can also provide the light shielding function. Thus, the manufacturing process of the light shielding unit 12 is different from the manufacturing process of the black matrix, and this disclosure is not limited. In other embodiments, which are not shown in the figures, the light shielding unit 12 can be disposed on the display area of the display panel 11 for preventing the light mixing between the subpixels of the display panel, so the function of the light shielding unit 12 is similar to the black matrix. In some embodiments, the light shielding unit 12 is disposed around the first polarizer 113.

The back plate 144 supports the display panel 11, and the first substrate 111 is disposed on the back plate 144. In some embodiments, the first substrate 111 contacts the back plate 144. The back plate 144 can provide a protection for protecting the display panel 11 from to collision, electromagnetic wave, electric shock, or moisture. In this embodiment, the back plate 144 is made of plastics, metals, alloys, polyesters, carbon fibers, or any of their combinations, and this disclosure is not limited. In some embodiments, the back plate 144 can be a supporting frame, which is made of metals, alloys, or plastics, and this disclosure is not limited.

The other technical features of the display devices 1a-1g can be referred to the display device 1, so the detailed descriptions thereof will be omitted.

To be noted, the configurations of the light shielding unit 12, the back plate 144 and/or other components of the above-mentioned display devices 1 and 1a-1g can be optionally selected based on the requirements, and this disclosure is not limited. In addition, one side of the reflective unit 142 is even with the optical unit 141. In other embodiments, the reflective unit 142 can be smaller than the optical unit 141, and be adhered between the optical unit 141 and the back plate 144 by double-sided glue for enhancing the connection strength between the optical unit 141 and the back plate 144. In addition, the display device of this disclosure can be a flexible display device, a curved surface display device, a touch display device, or any of other types of display devices, and this disclosure is not limited. In other embodiments, the light shielding unit 12 of the disclosure can be used in other display devices composed of other display intermedium for providing the desired light shielding function. The display device can be an OLED display device, a micro LED display device, a QD (quantum dot) display device, or any of other types of display devices, and this disclosure is not limited.

To sum up, in the display device of the disclosure, the light shielding unit is disposed on the non-active area or the side surface of the first substrate, and the light shielding unit is connected to the side surface of the first polarizer or the second polarizer. Thus, the light emitted from the backlight module to the display panel can be blocked by the light shielding unit, and the light cannot pass through the edge of the display panel. This configuration can prevent the light leakage issue of the display panel and improve the display quality.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device, comprising:
   a display panel comprising a first substrate, a second substrate and an upper polarizer, wherein the first substrate is disposed corresponding to the second substrate, and the upper polarizer is disposed on the second substrate;
   a light shielding unit connected to the upper polarizer and a side wall, wherein the side wall is located outside the display panel, and the light shielding unit is between the upper polarizer and the side wall; and
   a supporting unit disposed under the light shielding unit, wherein the supporting unit supports the display panel, and at least a part of the supporting unit corresponds to the light shielding unit, wherein a maximum elevation of the side wall is higher than a maximum elevation of a top surface of the display panel, and wherein the light shielding unit has an irregular surface, and in a top view, at least part of the irregular surface has a wavy edge.

2. The display device of claim 1, wherein the light shielding unit is disposed on a side surface of the second substrate.

3. The display device of claim 1, wherein the first substrate or the second substrate is a flexible board.

4. The display device of claim 1, wherein a thickness of the light shielding unit is greater than or equal to 15 μm and is less than or equal to 20 μm.

5. The display device of claim 1, wherein the light shielding unit is disposed on a side surface of the first substrate.

6. The display device of claim 1, wherein the display panel further comprising: a lower polarizer disposed on the first substrate.

7. The display device of claim 6, wherein the light shielding unit is connected to the lower polarizer.

8. The display device of claim 6, wherein an area of the upper polarizer is larger than an area of the lower polarizer in view of the top view.

9. The display device of claim 6, wherein a width of the upper polarizer is larger than a width of the lower polarizer in view of a sectional view of the display device.

10. The display device of claim 6, wherein an area of the light guiding plate is smaller than an area of the lower polarizer in view of the top view.

11. The display device of claim 6, wherein an area of the upper polarizer is smaller than an area of the lower polarizer in view of the top view of the display device.

12. The display device of claim 6, wherein a width of the upper polarizer is smaller than a width of the lower polarizer in view of a sectional view of the display device.

13. The display device of claim 1, further comprising:
   a backlight module disposed corresponding to the display panel.

14. The display device of claim 13, wherein the backlight module comprises a light guiding plate and a back plate.

15. The display device of claim 1, further comprising:
   a fixing unit disposed on the second substrate.

16. The display device of claim 15, wherein the fixing unit is disposed corresponding to a side surface of the display panel and the side wall.

17. The display device of claim 15, wherein the fixing unit contacts the display panel and a back plate, wherein the back plate comprises the side wall.

18. The display device of claim 15, wherein a thickness of the fixing unit disposed on the second substrate is less than a thickness of the upper polarizer.

\* \* \* \* \*